United States Patent
Bageshwar et al.

(10) Patent No.: US 8,340,852 B2
(45) Date of Patent: Dec. 25, 2012

(54) SYSTEM AND METHOD FOR SIMULTANEOUS LOCALIZATION AND MAP BUILDING

(75) Inventors: Vibhor L. Bageshwar, Minneapolis, MN (US); Kartik B. Ariyur, West Lafayette, MN (US)

(73) Assignee: Honeywell International Inc., Morristown, NJ (US)

( * ) Notice: Subject to any disclaimer, the term of this patent is extended or adjusted under 35 U.S.C. 154(b) by 668 days.

(21) Appl. No.: 12/432,026

(22) Filed: Apr. 29, 2009

(65) Prior Publication Data

US 2010/0280699 A1   Nov. 4, 2010

(51) Int. Cl.
G05D 1/00 (2006.01)

(52) U.S. Cl. ......... 701/26; 701/23; 701/28; 340/995.24; 340/995.25

(58) Field of Classification Search ............. 701/23, 701/28, 200, 207, 217; 340/995.24, 995.25
See application file for complete search history.

(56) References Cited

U.S. PATENT DOCUMENTS

| | | |
|---|---|---|
| 7,177,737 B2 | 2/2007 | Karlsson et al. |
| 2004/0073360 A1* | 4/2004 | Foxlin ............. 701/207 |
| 2005/0182518 A1 | 8/2005 | Karlsson |
| 2006/0041331 A1 | 2/2006 | Myeong et al. |
| 2007/0061043 A1 | 3/2007 | Ermakov et al. |

FOREIGN PATENT DOCUMENTS

EP   1468342   3/2007

OTHER PUBLICATIONS

Dissanayake et al., "A Solution to the Simultaneous Localization and Map Building (SLAM) Problem", "IEEE Transactions on Robotics and Automation", Jun. 2001, pp. 229-241, vol. 17, No. 3, Publisher: IEEE.

Monemerlo et al., "FastSLAM: A Factored Solution to the Simultaneous Localization and Mapping Problem", "Proceedings of the AAAI National Conference on Artificial Intelligence ", 2002.

Autio, Ilkka, "Fast SLAM (Simultaneous Localization and Mapping)", "available at http://www.cs.helsinki.fi/u/elomaa/opetus/slam.pdf", Oct. 28, 2002 , Publisher: University of Helsinki.

(Continued)

*Primary Examiner* — Lesley D Morris
*Assistant Examiner* — Jacob Knutson
(74) *Attorney, Agent, or Firm* — Fogg & Powers LLC

(57) ABSTRACT

An autonomous vehicle comprises at least one image sensor to provide measurements of landmark position for a plurality of landmarks; and processing functionality to estimate the position of the plurality of landmarks in a global frame and in the autonomous vehicle's frame, and to estimate the kinematic state of the autonomous vehicle in a global frame based, at least in part, on the measurements of landmark position from the at least one image sensor. The processing functionality is further operable to calculate errors in the estimated positions of the plurality of landmarks in the global frame and in the estimate of the kinematic state of the autonomous vehicle in the global frame by using a plurality of unit projection vectors between the estimated positions of the plurality landmarks in the autonomous vehicle's frame and a plurality of unit projection vectors between the estimated positions of the plurality of landmarks in the global frame.

7 Claims, 5 Drawing Sheets

OTHER PUBLICATIONS

Marco et al., "A Set Theoretic Approach to the Simultaneous Localization and Map Building Problem", "Proceeding of the 39th IEEE Conference on Decision and Control", 2000, pp. 833-838, vol. 1, Publisher: IEEE.

Mourikis et al., "Analysis of Positioning Uncertainty in Simultaneous Localization and Mapping (SLAM)", "Technical Report No. 2004-0002", Jul. 2004, pp. 1-31, Publisher: University of Minnesota—Department of Computer Science and Engineering.

Pacis et al., "An Adaptive Localization System for Outdoor/Indoor Navigation for Autonomous Robots", "SPIE Proceedings 6230: Unmanned Systems Technology VIII, Defense Security Symposium", Apr. 2006, pp. 17-20.

Riisgaard et al., "SLAM for Dummies", "available at http://ocw.mit.edu/NR/rdonlyres/Aeronautics-and-Astronautics/16-412JSpring-2005/9D8DB59F-24EC-4B75-BA7A-F0916BAB2440/0/1aslam_blas_repo.p", Oct. 23, 2005.

Se et al., "Visual Motion Estimation and Terrain Modeling for Planetary Rovers", "Proceedings of the 8th International Symposium on Artificial Intelligence, Robotics, and Automation in Space", Sep. 2005, Publisher: IEEE, Published in: Munich, Germany.

Shuster, "The Generalized Wahba Problem", "The Journal of the Astronautical Sciences", Jun. 2006, pp. 245-259, vol. 54, No. 2.

Stentz et al., "Real-Time, Multi-Perspective Perception for Unmanned Ground Vehicles", "Proceeding of AUVSI Unmanned Systems Symposium 2003", Jul. 2003.

Wahba, "Problem 65-1, A Least Squares Estimation of Satellite Attitude", "SIAM Review", Jul. 1966, pp. 384-386, vol. 8, No. 3.

Zunino, "Simultaneous Localization and Mapping for Navigation in Realistic Environments", "TRITA-NA-0203", Feb. 2002, pp. 1-87, Publisher: KTH, Published in: Sweden.

* cited by examiner

SYSTEM AND METHOD FOR SIMULTANEOUS LOCALIZATION AND MAP BUILDING

BACKGROUND

It is desirable for autonomous vehicles to be able to navigate in an unknown environment. One approach to navigating in an unknown environment is Simultaneous Localization And Map building (SLAM). Map Building refers to locating and estimating the position of landmarks in the unknown environment and Localization refers to estimating the position of the autonomous vehicle relative to the located landmarks. In other words, SLAM constitutes generating a map of the unknown environment and then navigating relative to the generated map.

The autonomous vehicle typically generates the map by using image sensors located on the autonomous vehicle to locate the landmarks. Landmarks can be any fixed object in the area such as trees, parked cars, buildings, statues, etc. The estimated location of the landmarks is initially resolved in the reference frame of the autonomous vehicle (also referred to herein as a vehicle frame) because the image sensors are mounted on the autonomous vehicle. However, in order to navigate effectively, the location of the landmarks must be resolved in a global reference frame (also referred to herein as a navigation frame). In estimating the orientation of the autonomous vehicle in the global frame, heading angle drift, or bias, error is introduced into the calculations.

The heading angle drift error refers to the difference between the actual heading angle and the estimated heading angle. The heading angle bias error introduces errors in the estimated position and velocity of the vehicle in the global frame as compared to the actual position and velocity of the vehicle and the estimated position of the landmarks in the global frame as compared to the actual position of the landmarks in the global frame.

One conventional technique for correcting the heading angle drift error is to compare the estimated location of a known landmark with the actual location of the known landmark. The difference in location is due, in part, to heading angle drift error. However, this technique requires knowledge of the actual location of the landmark. In environments where the actual location of a landmark is not known, the conventional technique can not be used.

SUMMARY

In one embodiment, an autonomous vehicle is provided. The autonomous vehicle comprises at least one image sensor to provide measurements of landmark position for a plurality of landmarks; and processing functionality to estimate the position of the plurality of landmarks in a global frame and in the autonomous vehicle's frame, and the kinematic state of the autonomous vehicle in a global frame based, at least in part, on the measurements of landmark position from the at least one image sensor. The processing functionality is further operable to calculate errors in the estimated positions of the plurality of landmarks in the global frame and in the estimate of the kinematic state of the autonomous vehicle in the global frame by using a plurality of unit projection vectors between the estimated positions of the plurality landmarks in the autonomous vehicle's frame and a plurality of unit projection vectors between the estimated positions of the plurality of landmarks in the global frame.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the accompanying drawings and the specification are not to be construed as limiting the order in which the individual steps may be performed. The following detailed description is, therefore, not to be taken in a limiting sense.

The embodiments described below enable the estimation of heading angle drift errors without knowledge of the actual location of any landmarks. In particular, the embodiments described below enable the estimation of heading angle drift error based on image sensor measurements of landmark locations.

Figure 1A:
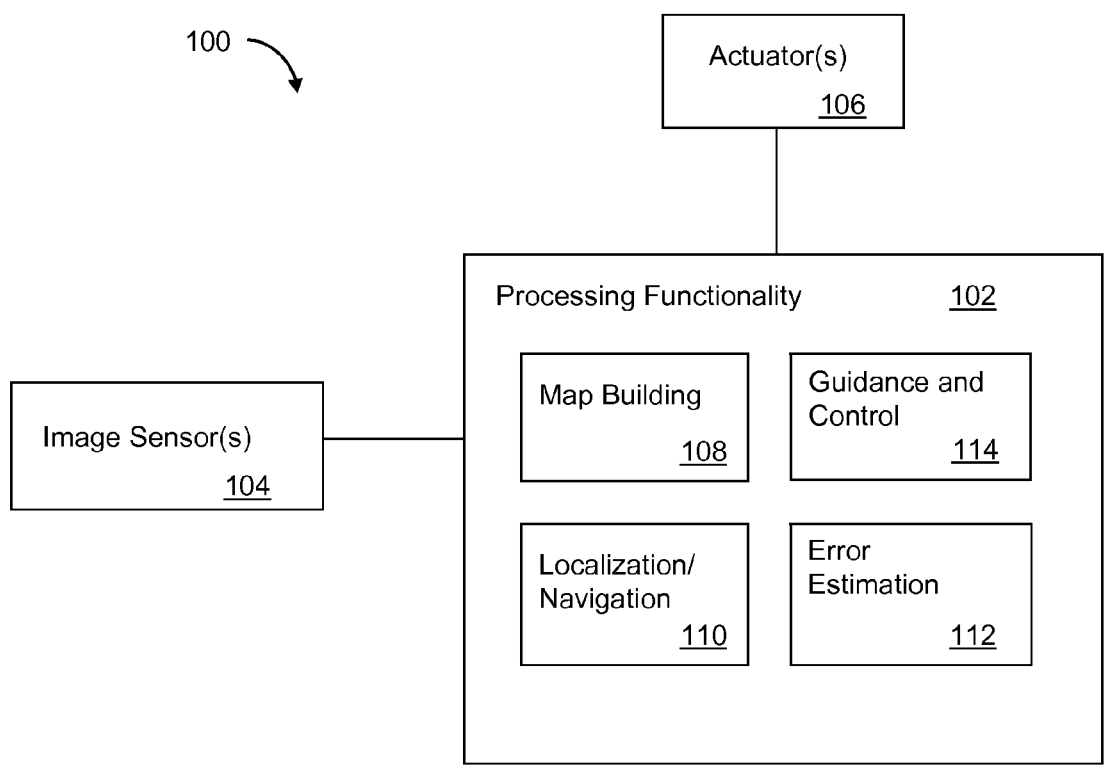
FIGS. 1A and 1B are block diagrams of embodiments of an autonomous vehicle.

FIG. 1A is a block diagram of one embodiment of an autonomous vehicle 100. Vehicle 100 includes one or more image sensors 104. For example, image sensors 104 can include, but are not limited to, stereo vision cameras, Laser Detection and Ranging (LADAR) sensors, milli-meter wave Radio Detection and Ranging (RADAR) sensors, ultrasonic range finders, etc. Image sensors 104 provide data regarding landmarks in the environment around the vehicle 100 to processing functionality 102.

Processing functionality 102 can be implemented using software, firmware, hardware, or any appropriate combination thereof, as known to one of skill in the art. For example, processing functionality 102 can include or interface with hardware components and circuitry that support the processing of sensor measurements to determine landmark location and estimate error in either the landmark or vehicle position. By way of example and not by way of limitation, these hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA).

Software instructions for performing the processing of processing functionality 102 can be tangibly embodied in any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD- ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 1B:
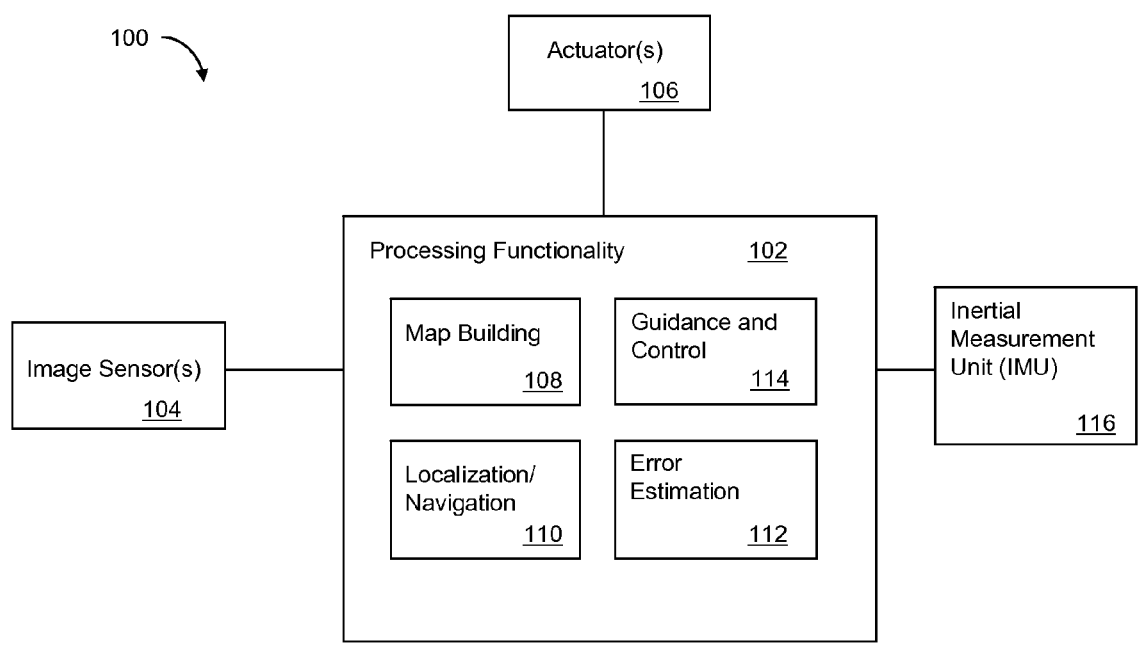

Processing functionality 102 includes map building functionality 108, Localization/Navigation functionality 110, and Error estimation functionality 112. Map building functionality 108 uses the measurements from Image sensors 104 to measure and estimate the location of landmarks in the environment around the vehicle 100 using techniques known to one of ordinary skill in the art. Localization/Navigation functionality 110 estimates the kinematic state of the vehicle 100 and landmark positions in the global frame (also referred to herein as the navigation frame) using techniques known to one of skill in the art. For example, in some embodiments, an extended Kalman filter is used to blend measurements from different sensors to estimate the kinematic state of the vehicle. The different sensors can include, but are not limited to, different types of image sensors, as mentioned above, and an Inertial Measurement Unit (IMU), as shown in FIG. 1B, which provides measurements of the kinematic state of the vehicle 100. As used herein, the kinematic state of the vehicle 100 refers to the vehicle's position, velocity, attitude (three-dimensional orientation), and/or angular velocity. A global frame is a reference frame that is independent of the vehicle orientation or position.

Error estimation functionality 112 in processing functionality 102 estimates the heading angle drift error, corrects the estimates of the vehicle's attitude, and corrects the estimated position and velocity of the vehicle in the global frame and the estimated position of the landmarks in the global frame using measurements of the position of the landmarks in the autonomous vehicle's frame. In particular, error estimation functionality 112 compares the estimated position of the landmarks in the global frame with the measurements of the landmark positions in the vehicle frame. Since the images sensors 104 obtain measurements of the landmark positions in the vehicle frame, the estimates of landmark position in the vehicle frame are not subject to the heading angle drift error. Hence, error estimation functionality 112 is able to estimate the heading angle drift error without requiring knowledge of the actual location of the landmarks. Additional details regarding the estimation of heading angle drift errors are described below with respect to FIG. 3. Error estimation functionality 112 also updates estimates of the vehicle's position and velocity and landmark position in the global frame using the estimated heading angle drift error.

Guidance and control functionality 114 uses the updated estimates of vehicle kinematic state and landmark position to calculate control signals for actuators 106 using techniques known to one of ordinary skill in the art. For example, actuators 106 in a land vehicle can include, but are not limited to, brakes, steering column, accelerator, etc. It is to be understood, however, that vehicle 100 is not to be limited to a land vehicle. In particular, vehicle 100 can be implemented as an Unmanned Aerial Vehicle (UAV), a lunar lander, a planetary rover, or an Unmanned Underwater Vehicle (UUV) in other embodiments. In such embodiments, actuators 106 are implemented according to the type of vehicle. Thus, guidance and control functionality 114 provides control signals to cause the vehicle to change heading, increase and decrease speed, etc. based on the updated estimates of vehicle kinematic state and landmark positions in the global frame.

Figure 2:
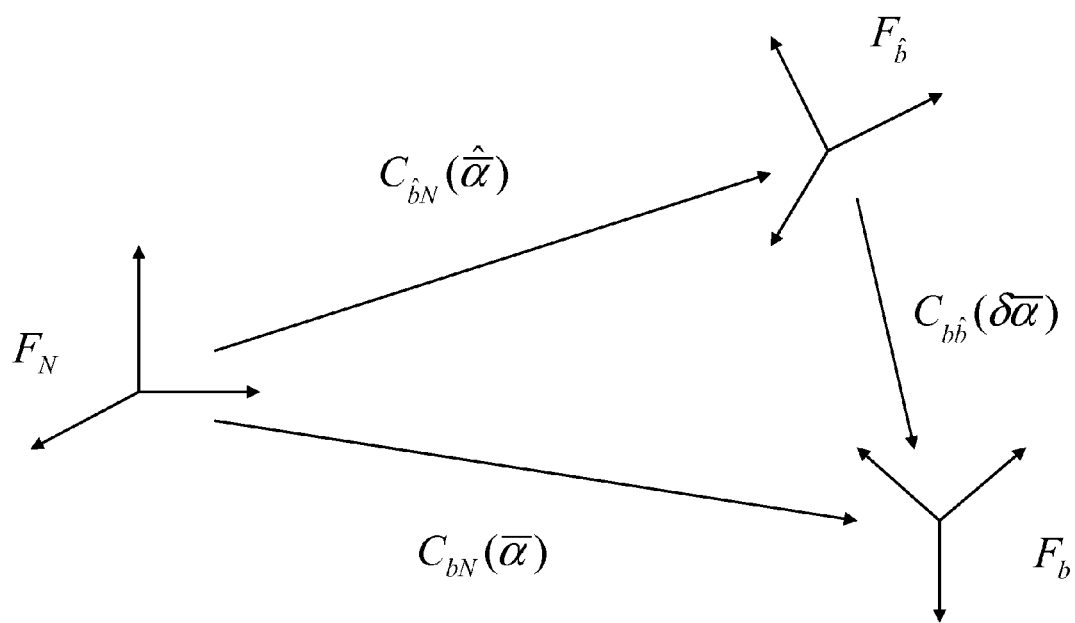
FIG. 2 is an exemplary diagram depicting a relationship between a global frame, an estimated body frame, and an actual body frame.

FIG. 2 is a diagram representing an exemplary relationship between the actual vehicle frame, $F_b$, the global frame, $F_N$, and the estimated orientation of the vehicle relative to the global frame or estimated vehicle frame, $F_{\hat{b}}$. In FIG. 2, the Direction Cosine Matrix, $C_{\hat{b}N}(\hat{\alpha})$, represents the rotation between the global frame and the estimated vehicle frame, where $\hat{\alpha}$ represents the estimated Euler angles of the vehicle (also referred to as mean orientation angles). The Direction Cosine Matrix, $C_{bN}(\bar{\alpha})$, represents the rotation between the global frame and the actual vehicle frame, where $\bar{\alpha}$ represents the actual Euler angles of the vehicle. The difference in orientation between the actual vehicle frame and the estimated vehicle frame is represented by the Direction Cosine Matrix, $C_{b\hat{b}}(\delta\bar{\alpha})$, where $\delta\bar{\alpha}$ is the error in the Euler angles or difference between the estimated Euler angles and the actual Euler angles. The estimated vehicle frame is the orientation of the vehicle 100 calculated using the estimated Euler angles and the actual vehicle frame is the orientation of the vehicle 100 calculated using the actual Euler angles.

Figure 3:
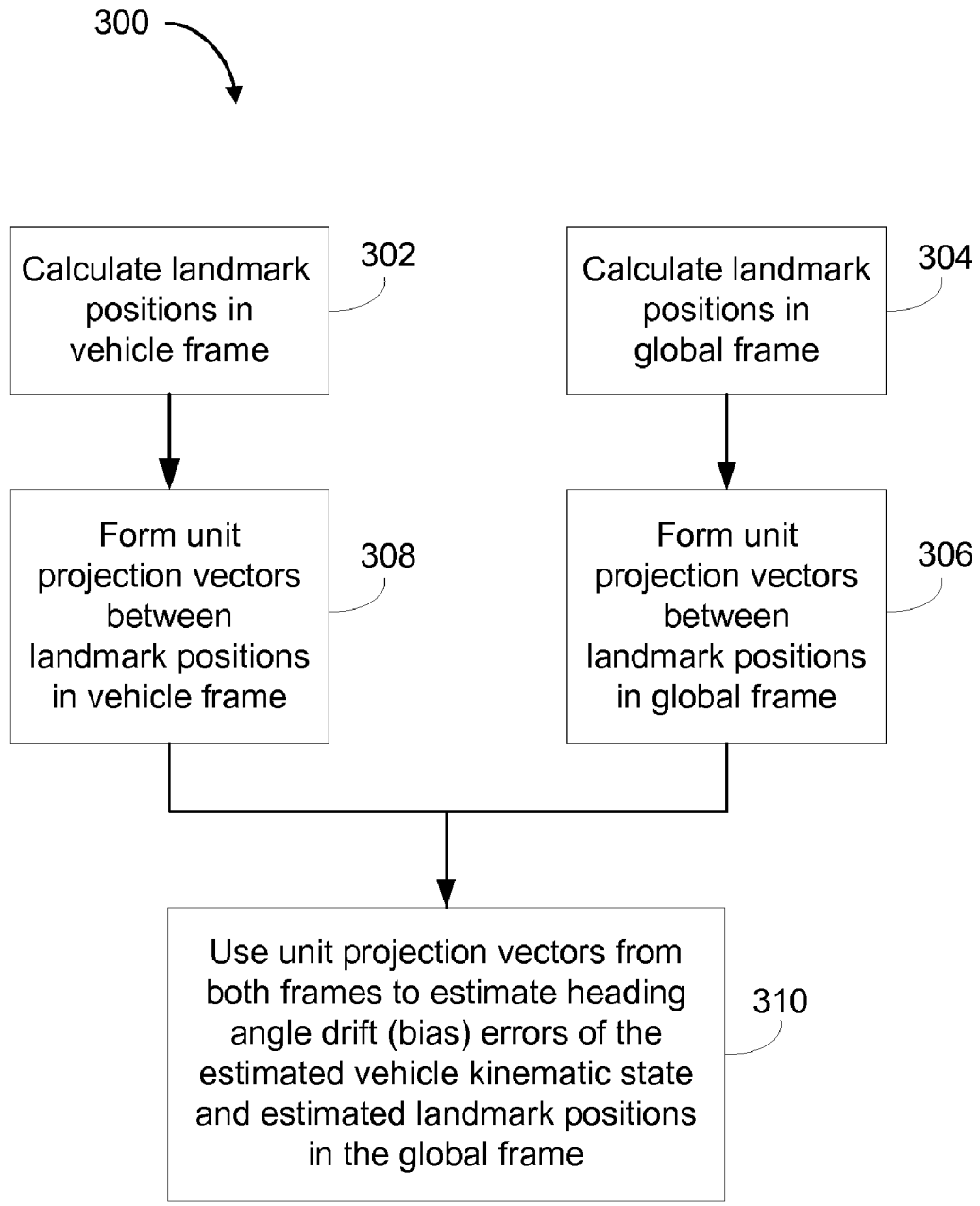
FIG. 3 is a flow chart depicting one embodiment of a method of estimating heading angle drift errors.

FIG. 3 is a flow chart of one embodiment of a method 300 of estimating the heading angle drift error and correcting the estimates of the kinematic state of the vehicle and the position of landmarks in the global frame. Method 300 is implemented in Error estimation functionality 112 described above. At block 302, landmark positions are calculated in the vehicle frame (also referred to herein as a body frame) using measurements of landmark positions from Image sensors 104. At block 304, the landmark positions are calculated in the global frame by resolving the estimated landmark positions in the autonomous vehicle frame in the global frame.

At block 306, unit projection vectors are formed between landmark positions in the global frame. In particular, unit projection vectors are formed between positions of at least three landmarks. The unit projection vectors in the global frame can be represented by the equation:

$$u_{ij}^N = \frac{l_i^N - l_j^N}{|l_i^N - l_j^N|}, \qquad \text{Eq. 1}$$

i≠j (note: the superscript N refers to resolving a vector in the navigation, or global, frame)

At block 308, unit projection vectors are formed between landmark positions in the vehicle frame. The same set of landmarks that are used in block 306 in the global frame are used in block 308. The unit projection vectors in the vehicle frame can be represented by the equation:

$$u_{ij}^b = \frac{l_i^b - l_j^b}{|l_i^b - l_j^b|}, \qquad \text{Eq. 2}$$

i≠j (note: the superscript b refers to resolving a vector in the body, or vehicle, frame)

In the above equations the subscripts i and j are incremented from 1 to the total number of landmarks used. At block 310, the unit projection vectors are used to calculate the heading angle drift errors in the estimate of the vehicle kinematic state and the estimate of the landmark positions in the global frame. In particular, a constrained optimization problem, such as Wahba's problem in this embodiment, is formulated and solved using the projection vectors. Wahba's problem is a general constrained optimization problem described in *SIAM Review*, Vol. 8, No. 3 (July, 1966), 384-386. Formulating and solving Wahba's problem includes finding the Direction Cosine Matrix $C_{b\hat{b}}$ which minimizes the Euclidean norm between the unit vectors. This can be expressed by the following equation:

$$J = \min_{C_{b\hat{b}}} \sum_{n=1}^{\text{No. of unique Lmk pairs}} |u_{ij,n}^b - C_{b\hat{b}}(C_{\hat{b}N} u_{ij,n}^N)|, \quad \text{Eq. 3}$$

$$\text{subject to } C_{b\hat{b}} C_{b\hat{b}}^T = C_{b\hat{b}}^T C_{b\hat{b}} = I_{3\times 3}$$

The known Singular Value Decomposition (SVD) method is then applied to find an optimal solution. An optimal solution preserves the orthonormal constraint of the Direction Cosine Matrix $C_{b\hat{b}}$. In applying the SVD method, a matrix M is formulated from the outer product of the unit vector projections, as represented by the following equation:

$$M = \sum_{n=1}^{\text{No. of unique Lmk pairs}} u_{ij,n}^b u_{ij,n}^{bT} \quad \text{Eq. 4}$$

Then, the SVD is computed as represented by the following equation:

$$M = U\Sigma V^T \quad \text{Eq. 5}$$

In equation 5 above, the matrix $\Sigma$ is a diagonal matrix containing singular values of the matrix M. The columns of matrix U form a set of mutually orthogonal vectors which are formulated from the eigenvectors of $-MM^T$. The matrix $V^T$ is the conjugate transpose of the matrix V whose columns form a set of mutually orthogonal vectors which are formulated from the eigenvectors of $M^T M$. An optimal solution to Wahba's problem is calculated using the matrices U and V as shown in the following equation:

$$C_{b\hat{b}} = U \text{diag}[1 \ 1 (\det U \det V)] V^T \quad \text{Eq. 6}$$

Figure 4:
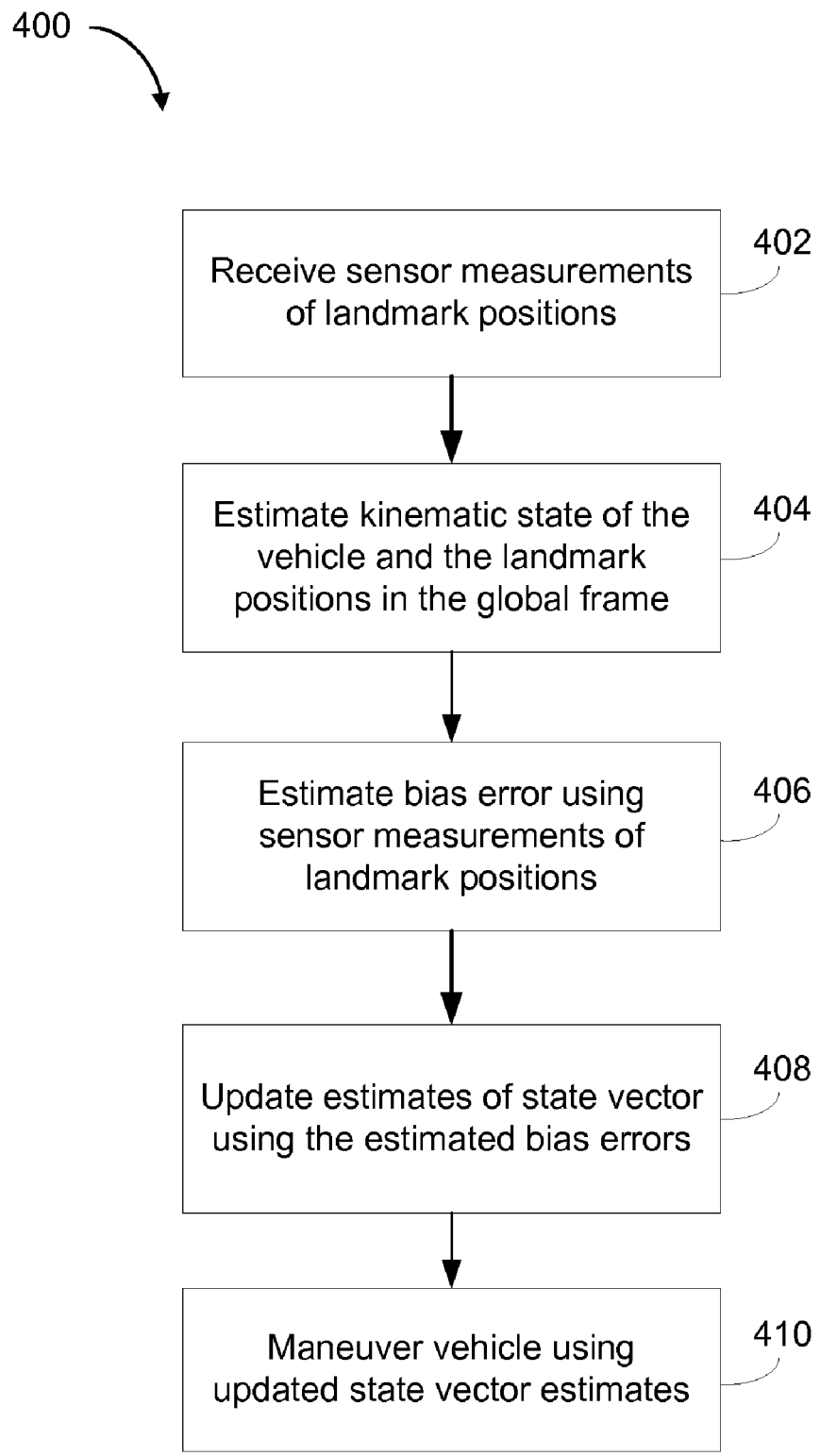
FIG. 4 is a flow chart depicting one embodiment of a method of operating an autonomous vehicle.

FIG. 4 is a flow chart depicting one embodiment of a method 400 of operating an autonomous vehicle which incorporates the error estimation described above. At block 402, sensor measurements regarding the position of landmarks in the vehicle frame are received from image sensors 104. At block 404, the kinematic state of the autonomous vehicle in the global frame and the landmark positions in the global frame are calculated. At block 406, heading angle drift errors in the estimated vehicle kinematic state in the global frame and/or the estimate of the landmark positions in the global frame are calculated as described above with respect to method 300. At block 408, estimates of the vehicle's state vector are updated based on the calculated heading angle drift errors. The vehicle's state vector includes the vehicle's kinematic state and the landmark positions in the global frame. In particular, the mean orientation angles are updated using the following equation:

$$\hat{C}_{bN} = C_{b\hat{b}} C_{\hat{b}N} \quad \text{Eq. 7}$$

In equation 7, $C_{b\hat{b}}$ is the Direction Cosine Matrix formulated from the estimates of heading angle bias error. $C_{\hat{b}N}$ is the Direction Cosine Matrix which represents the rotation between the global frame and the estimated vehicle frame. $\hat{C}_{bN}$ is the updated Direction Cosine Matrix which represents the rotation between the global frame and the actual vehicle frame. The corrected Euler angles (mean orientation angles) are computed from $\hat{C}_{bN}$.

The mean vehicle position vector in the global frame, $\hat{p}_{k/k}^N$, is updated as expressed in the following equation:

$$\hat{p}_{k/k}^N = C_{N\hat{b}} C_{\hat{b}b} \hat{p}_{k/k}^b \quad \text{Eq. 8}$$

In equation 8, $\hat{p}_{k/k}^b$ is the mean vehicle position vector estimate in the vehicle frame following updates using measurements from the Image sensors 104. The estimate landmark position vector in the global frame, $\hat{l}_{k/k}^N$, is updated as expressed in the following equation:

$$\hat{l}_{k/k}^N = C_{N\hat{b}} C_{\hat{b}b} \hat{l}_{k/k}^b \quad \text{Eq. 9}$$

In equation 9, $\hat{l}_{k/k}^b$ is the mean landmark position vector estimate in the vehicle frame following updates using measurements from the Image sensors 104. After updating the vehicle and landmark position vector estimates in the global frame, the autonomous Vehicle 100 maneuvers in the area using the updated position vector estimates at block 410. In particular, Vehicle 100 provides control signals to one or more actuators to control movement of the Vehicle 100 as described above.

Hence, the embodiments described herein enable the calculation of errors in the vehicle kinematic state estimates and landmark positions in the global frame without the need for knowledge of the actual location of any landmarks. This helps enable the Vehicle 100 to maneuver in unknown environments.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An autonomous vehicle comprising:
   at least one image sensor to provide measurements of landmark position for a plurality of landmarks; and
   processor to estimate the position of the plurality of landmarks in a global frame and in the autonomous vehicle's frame, and to estimate the kinematic state of the autonomous vehicle in a global frame based, at least in part, on the measurements of landmark position from the at least one image sensor;
   wherein the processor is further operable to calculate errors in the estimated positions of the plurality of landmarks in the global frame and in the estimate of the kinematic state of the autonomous vehicle in the global frame by using a plurality of unit projection vectors between the estimated positions of the plurality landmarks in the autonomous vehicle's frame and a plurality of unit projection vectors between the estimated positions of the plurality of landmarks in the global frame.

2. The autonomous vehicle of claim 1, wherein the at least one image sensor comprises one or more of stereo vision cameras, a Laser Detection and Ranging (LADAR) sensor, a milli-meter wave Radio Detection and Ranging (RADAR) sensor, and an ultrasonic range finder.

3. The autonomous vehicle of claim 1, further comprising an inertial measurement unit (IMU) to provide measurements related to the kinematic state of the autonomous vehicle in the autonomous vehicle's frame.

4. The autonomous vehicle of claim 1, wherein the processor is operable to calculate an optimal solution to a constrained optimization problem using the unit projection vectors from the autonomous vehicle's frame and the unit projection vectors from the global frame to calculate heading angle drift errors, and to calculate the errors in the estimated positions of the plurality of landmarks in the global frame and in the estimate of the kinematic state of the autonomous vehicle in the global frame.

5. The autonomous vehicle of claim 4, wherein the processor is operable to update the estimated positions of the plurality of landmarks in the global frame and the estimate of the kinematic state of the autonomous vehicle in the global frame based on the calculated heading angle drift errors.

6. The autonomous vehicle of claim 5, further comprising:
at least one actuator responsive to the processor and operable to control movement of the autonomous vehicle;
wherein the processor is operable to provide control signals to the at least one actuator based on the updated estimates of the positions of the plurality of landmarks in the global frame and the updated estimate of the kinematic state of the autonomous vehicle in the global frame.

7. The autonomous vehicle of claim 1, wherein the autonomous vehicle is one of an unmanned land vehicle, an unmanned aerial vehicle, a lunar lander, a planetary rover, and an unmanned underwater vehicle.

* * * * *